(12) United States Patent
Baddourah et al.

(10) Patent No.: US 9,372,766 B2
(45) Date of Patent: Jun. 21, 2016

(54) CIRCUMVENTING LOAD IMBALANCE IN PARALLEL SIMULATIONS CAUSED BY FAULTY HARDWARE NODES

(71) Applicant: Saudi Arabian Oil Company, Dhahran (SA)

(72) Inventors: Majdi A. Baddourah, Dhahran (SA); M. Ehtesham Hayder, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 156 days.

(21) Appl. No.: 14/178,108

(22) Filed: Feb. 11, 2014

(65) Prior Publication Data
US 2015/0227442 A1    Aug. 13, 2015

(51) Int. Cl.
| G06F 11/00 | (2006.01) |
| G06F 11/20 | (2006.01) |
| G06F 9/48  | (2006.01) |
| G06F 9/50  | (2006.01) |
| G06F 11/07 | (2006.01) |

(52) U.S. Cl.
CPC .......... *G06F 11/2007* (2013.01); *G06F 9/4856* (2013.01); *G06F 9/5083* (2013.01); *G06F 11/0709* (2013.01); *G06F 11/0757* (2013.01); *G06F 11/203* (2013.01); *G06F 2201/85* (2013.01)

(58) Field of Classification Search
CPC ............ G06F 11/07–11/0748; G06F 11/1425; G06F 11/202–11/2048; G06F 11/0757
See application file for complete search history.

(56) References Cited

U.S. PATENT DOCUMENTS

| 4,740,969 A    | 4/1988  | Fremont |
|----------------|---------|---------|
| 7,475,274 B2 * | 1/2009  | Davidson ............ G06F 11/1438 714/2 |
| 7,796,527 B2   | 9/2010  | Archer et al. |
| 7,966,340 B2   | 6/2011  | Friedman et al. |
| 8,055,940 B2 * | 11/2011 | Ellis .......................... G06F 9/52 714/11 |
| 8,082,468 B1   | 12/2011 | Backensto et al. |
| 8,527,809 B1   | 9/2013  | Backensto et al. |
| 2002/0152446 A1| 10/2002 | Fleming |

(Continued)

FOREIGN PATENT DOCUMENTS

WO    WO 2005/050404    6/2005

OTHER PUBLICATIONS

Amdahl, "Validity of the Single-Processor Approach to Achieving Large Scale Computing Capabilities". Proc. Am. Federation of Information Processing Societies Conf., AFIPS Press, 1967, 4 pages.

(Continued)

*Primary Examiner* — Michael Maskulinski
(74) *Attorney, Agent, or Firm* — Fish & Richardson P.C.

(57) ABSTRACT

The present disclosure describes methods, systems, and computer program products for circumventing parallel processing load imbalance. One computer-implemented method includes generating a library function for a plurality of parallel-processing nodes, receiving timing statistics from each of the plurality of parallel-processing nodes, the timing statistics generated by executing the library function on each parallel-processing node, determining that a faulty parallel-processing node exists, signaling a simulator to checkpoint and stop a simulation executing on the parallel processing nodes, and removing the faulty parallel-processing node from parallel processing nodes available to execute the simulation.

20 Claims, 4 Drawing Sheets

(56) References Cited

U.S. PATENT DOCUMENTS

| | | | |
|---|---|---|---|
| 2006/0195508 A1* | 8/2006 | Bernardin | G06F 9/505 709/203 |
| 2007/0038891 A1 | 2/2007 | Graham | |
| 2011/0131425 A1 | 6/2011 | Banerjee et al. | |
| 2011/0196909 A1 | 8/2011 | Norum | |
| 2011/0246816 A1 | 10/2011 | Hsieh et al. | |
| 2013/0090906 A1 | 4/2013 | AlShaikh et al. | |
| 2013/0155902 A1 | 6/2013 | Feng et al. | |
| 2013/0246030 A1 | 9/2013 | Usadi et al. | |
| 2014/0344618 A1* | 11/2014 | Southern | G06F 11/1487 714/10 |

OTHER PUBLICATIONS

Gustafson, "Reevaluating Amdahl's Law", Communications of the ACM, 31(5), 1967, 3 pages.

Hayder et al. "Challenges in High Performance Computing for Reservoir Simulation," SPE 152414, EAGE Annual Conference and Exhibition incorporating SPE Europec, Jun. 2012, 14 pages.

International Search Report and Written Opinion of the International Searching Authority issued in International Application No. PCT/US2015/015005 on Jul. 17, 2015; 12 pages.

Hoffman et al.; "Application Heartbeats for Software Performance and Health"; Computer Science and Artificial Intelligence Laboratory Technical Report; Aug. 7, 2009, 11 pages.

* cited by examiner

CIRCUMVENTING LOAD IMBALANCE IN PARALLEL SIMULATIONS CAUSED BY FAULTY HARDWARE NODES

BACKGROUND

Parallel computation is a method used to reduce simulation turnaround time. Computational domain decomposition into smaller processing units is the common practice of dividing a computational load among processors in parallel computations, such as those currently practiced in various simulations. As expected, with certain limitations (e.g., Amdahl's law, faster networks, load imbalance, etc.), simulation turnaround time is likely to decrease as more and more processors are added for a given simulation task for a computational domain. While load imbalance among processors can be a result of non-optimal decomposition of the computational domain, load imbalance can also be a result of faulty hardware (node) on the computational platform, even though a particular computational algorithm may be perfectly balanced for execution on each of a plurality of parallel-processing processors associated with a node. The use of a faulty node in a parallel computation can result in, among other things, performance degradation, slowdown of a simulation, erroneous data, business inefficiency, loss of revenue, user dissatisfaction, and/or an increase in a total cost of ownership for a simulation/simulation system.

SUMMARY

The present disclosure relates to computer-implemented methods, computer-readable media, and computer systems for providing declarative authorizations for circumventing parallel processing load imbalance. One computer-implemented method includes generating a library function for a plurality of parallel-processing nodes, receiving timing statistics from each of the plurality of parallel-processing nodes, the timing statistics generated by executing the library function on each parallel-processing node, determining that a faulty parallel-processing node exists, signaling a simulator to checkpoint and stop a simulation executing on the parallel processing nodes, and removing the faulty parallel-processing node from parallel processing nodes available to execute the simulation.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the library function is load balanced across the plurality of parallel-processing nodes.

A second aspect, combinable with any of the previous aspects, wherein each parallel-processing node suspends operations to execute the library function.

A third aspect, combinable with any of the previous aspects, wherein the determination that a faulty parallel-processing node exists is based, at least in part, on the received timing statistics.

A fourth aspect, combinable with any of the previous aspects, further comprising generating a checkpoint file containing the status of all non-faulty parallel-processing nodes.

A fifth aspect, combinable with any of the previous aspects, further comprising instructing the simulator to restart the simulation using the checkpoint file.

A sixth aspect, combinable with any of the previous aspects, further comprising sending an informational alert to a system administrator, the informational alert containing at least an identification of a faulty node.

The subject matter described in this specification can be implemented in particular implementations so as to realize one or more of the following advantages. First, average simulation turnaround time is reduced by detecting and removing faulty parallel-processing hardware (node) performing simulation tasks to circumvent a parallel-processing load imbalance caused by the faulty node. Simulation processing performance is further maximized by ensuring at least a balanced processing load among nodes. Second, an executing simulation's performance is affected in only an insignificant manner when nodes are tested, and the simulation is allowed to proceed normally if no hardware faults are detected. Third, simulation state is preserved while removing detected faulty nodes as the simulation can be "check pointed" to resume from a known state once a faulty node is removed. Fourth, detection and removal of a faulty node is expected to result in a monetary savings because an additional node that would normally have been obtained in an attempt to increase simulation performance in conjunction with the faulty node is no longer needed. Fifth, the detection workflow is automatic and the simulation progresses without any interruption to a user. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
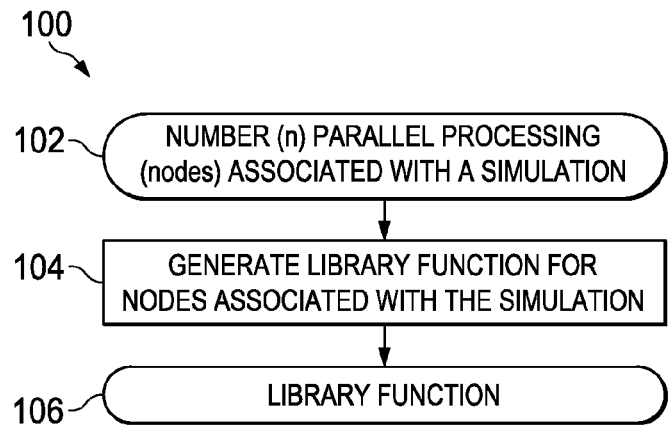
FIG. 1 illustrates a process to generate a library function according to an implementation.

This disclosure generally describes computer-implemented methods, computer-program products, and systems for circumventing parallel processing load imbalance. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Parallel computation is a method to reduce simulation turnaround time. However, there are challenges and issues in parallel computing needing consideration: 1) domain decomposition into smaller processing units is the common practice of dividing computational load among processing (nodes) for parallel computations, including those currently practiced in simulations, such as reservoir simulations. As expected, simulation turnaround time is likely to decrease as more and more nodes are added for a given simulation task. Three factors typically prevent further scaling-up as more nodes are added: a) a serial component in the simulation algorithm; b) communication overhead among nodes; and c) load imbalance in a simulation. Amdahl's law describes the limit of scalability due to the serial portion in a computational algorithm. Researchers have investigated how to reduce the impact of this limitation through, for example, efficient parallel algorithms designed to reduce the effect of the serial portion of the computational algorithm. Faster network connections may reduce communication overhead and are used for large scale reservoir simulations. While load imbalance in simulations can be a result of non-optimal decomposition of the computational domain, load imbalance can also be a result of faulty node hardware on the computational platform, although the computational algorithm may be perfectly balanced.

At present, many large computational platforms are being built using commodity/commercial off-the-shelf hardware nodes (e.g., interface, processor, memory, network, etc.). Reliability of any commercial/commodity node may be an issue as number of components increases significantly and long-term simulations are performed. As large-scale simulations are performed on larger computational clusters or simulation grids based on commodity/commercial nodes, a probability of faulty nodes among a large pool of available processing nodes may not be insignificant. As simulation grid become very large, simulations can be adversely impacted as the time necessary to complete a processing unit with faulty nodes increases an overall simulation's turnaround time or the failure to complete a processing unit slows or stops a simulation. It is desirable to be able to monitor the health (detect and identify faulty nodes) of a computational system and to have an available methodology to circumvent a load imbalance caused by the faulty nodes.

The disclosure describes a tool (a library function and a software agent) to determine the presence of a faulty node causing performance degradation or/slowdown of simulation. In some implementations, the library function is a perfect or nearly perfect computational and communication load (balanced or almost balanced) for available number of parallel-processing nodes. The library function is also instrumented to collect timing statistics on all nodes and to provide the timing statistics to the software agent. The software agent analyzes timing statistics generated by the library function and takes corrective actions in case of load imbalance among the nodes. For example, upon detecting a faulty node using timing statistics received from the library function, the software agent sends a signal to a simulation to stop and checkpoint its existing state. The software agent then removes (e.g., "offlines") the defective node from the computational platform and allows the simulation to restart from the checkpoint on remaining computational platform nodes. The workflow is automatic and the simulation progresses without user interruption. In some implementations, an administrative user is notified by the software agent of the detected faulty node so that corrective action can be taken.

FIG. 1 illustrates a process 100 to generate a library function according to an implementation. The library function 106 can be, in some implementations, parallel-processing message passing interface (MPI) code with load balanced computations across parallel-processing nodes. In other implementations, the library function can be any non-MPI parallel-processing code consistent with this disclosure with perfected balanced computations among parallel-processing nodes.

In some implementations, the library function 106 can be a parallel-processing matrix multiplication routine. As will be appreciated by those of ordinary skill in the art, the library function 106 can be constructed to operate in many different ways consistent with this disclosure. The described example of the parallel matrix multiplication routine is not meant to limit this disclosure in any way. Other types of library functions 106 are envisioned to be covered by this disclosure.

At 104, a number of available/given parallel processors (e.g., software and/or hardware processors) 102 associated with a simulation is used to construct 104 the library function 106 where load (numerical operation counts) is balanced. In some implementations, the above-described software agent can be used to construct the library function 106. In other implementation a separate process (not illustrated) can be used to construct the library function 106. The constructed library function 106 is specialized software code providing accurate benchmark timing when run on a node 102. The library function 106 is then configured to be transferred to and/or triggered to execute on each node 102 associated with the simulation. In some implementations, the library function 106 is stored in the memory of each node 102 for immediate availability. In other implementations, the library function 106 can be transferred to each node 102 on an as-needed basis for execution by the simulator and/or other process (e.g., a timer, system health monitoring process, etc.). The software agent controls the workflow including, in some implementations and among other things, executing the library function 106 at certain time intervals, sending signals to stop and restart simulations, etc. In some implementations, the library function 106 resides on a storage location (e.g., storage disk, etc.) with the software agent. In some implementations, the storage is accessible by all nodes 102 (and vice versa) so that the software agent can execute the library function 106 on all nodes 102. In some implementations, software agents can be stored/execute locally on each node 102 and be controlled by a master software agent stored/executing remote to the node 102. In some implementations, the library function 106 can be stored on each node for immediate access by either a locally stored or a remote library function 106. In some implementations, the software agent and/or library function 106 can be transferred to a node 102 prior to execution of the library function 106.

Figure 2:
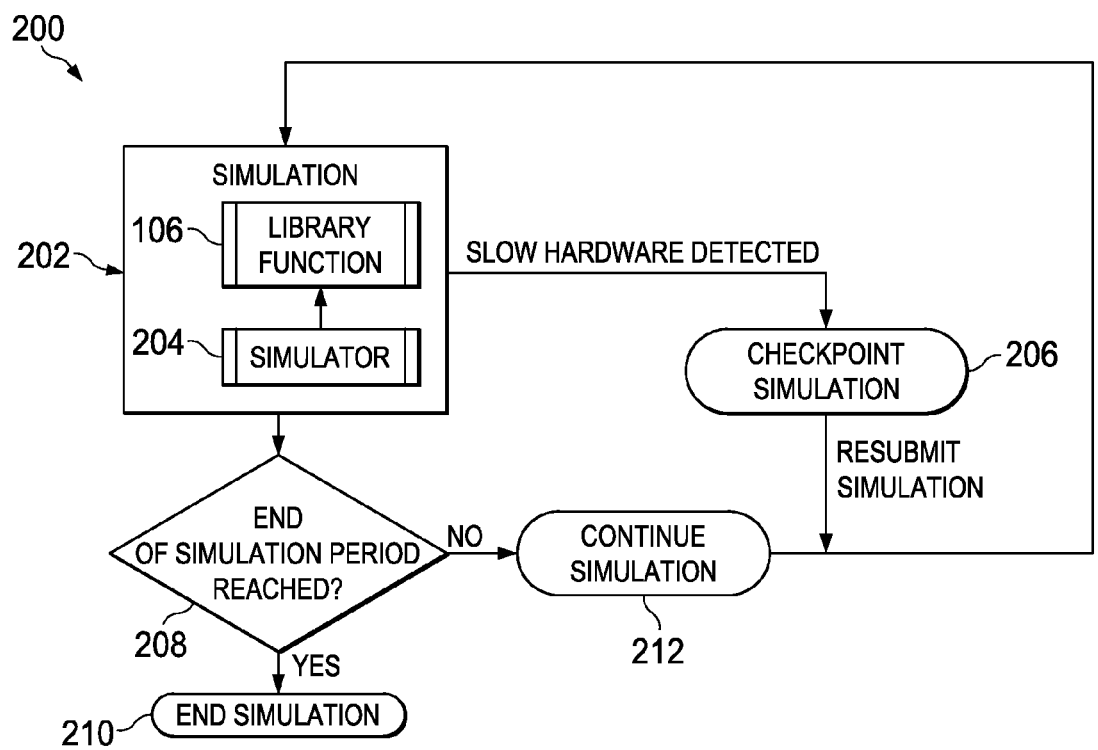
FIG. 2 illustrates a high-level process for circumventing parallel processing load imbalance according to an implementation.

FIG. 2 illustrates a high-level process 200 for circumventing parallel processing load imbalance according to an implementation. Simulation 202 includes a simulator 204, and the above describe library function 106. As described with respect to FIG. 1, there are n nodes 102 associated with the parallel-processing simulation 202. In some implementations, the simulator 204 calls the library function 106 (e.g., in response to a set time, triggering event, etc.) which in turn executes on each of the n nodes 102 to generate timing statistics with respect to the execution of the library function 106 for analysis by software agent (not illustrated). In other implementations, a separate process (not illustrated) can be used to instruct the simulator to call the library function 106 to execute. For example, a separate system health monitoring process can detect a lack of received node "heartbeat" or other data from one or more nodes 102 and notify the simulator that the library function should be executed on all nodes 102 associated with the simulation.

In some implementations, when the library function 102 executes on each node, simulation operations on the node 102 are suspended while the library function 106 executes. In some implementations, one or more factors apart from CPU processing time are taken into account to generate timing statistics for each node 102. For example, network transmission delay, memory access delay, and the like can be factored into a timing statistic received by the software agent from each node 102.

The software agent receives timing statistics from each node 102 and compares the received timings from all nodes 102 to determine whether there is a faulty node 102. For example, an interface, memory, and/or network hardware associated with a node 102 could be malfunctioning and timing statistics could indicate a hardware issue with the node 102. In another example, the hardware and/or software processor (e.g., CPU) associated with a node 102 could be generating erroneous, slow, or no expected results. The received (or possibly not received) timing statistics could indicate a faulty node 102.

While, in typical implementations, a particular node 102 is assumed to be faulty if the timing on that particular node 102 is higher than a threshold level (e.g., a percentage above an average time observed over all nodes 102—such as ten percent over 9.6 seconds), other criteria can also be used in other implementations to indicate a faulty node 102. For example, if a CPU associated with a node 102 is returning obviously erroneous results, the node 102 can also be considered faulty.

If a faulty node 102 is detected, the software agent can issue a command to the simulator 204 to generate a simulation restart file(s) (checkpoint), stop the simulation 202, and/or offline (remove from service) the faulty node 102. In some implementations, the simulator can instruct each node 102 to generate checkpoint data for the simulator 204 to use in generating the checkpoint file(s) at 206. The checkpoint file(s) can then be used to resubmit (restart) the simulation 202 to continue from the checkpoint(s) when requested by the software agent. In some implementations, checkpoint file(s) are stored on a shared storage location(s) as described above.

While executing the simulation, the simulator 204 can determine 208 whether the end of the simulation period has been reached. If it is determined that the end of the simulation period has been reached, the simulation can be ended at 210 by the simulator 204. If it is determined that the end of the simulation period has not been reached, the simulation can be continued by the simulator 204 at 212.

Figure 3:
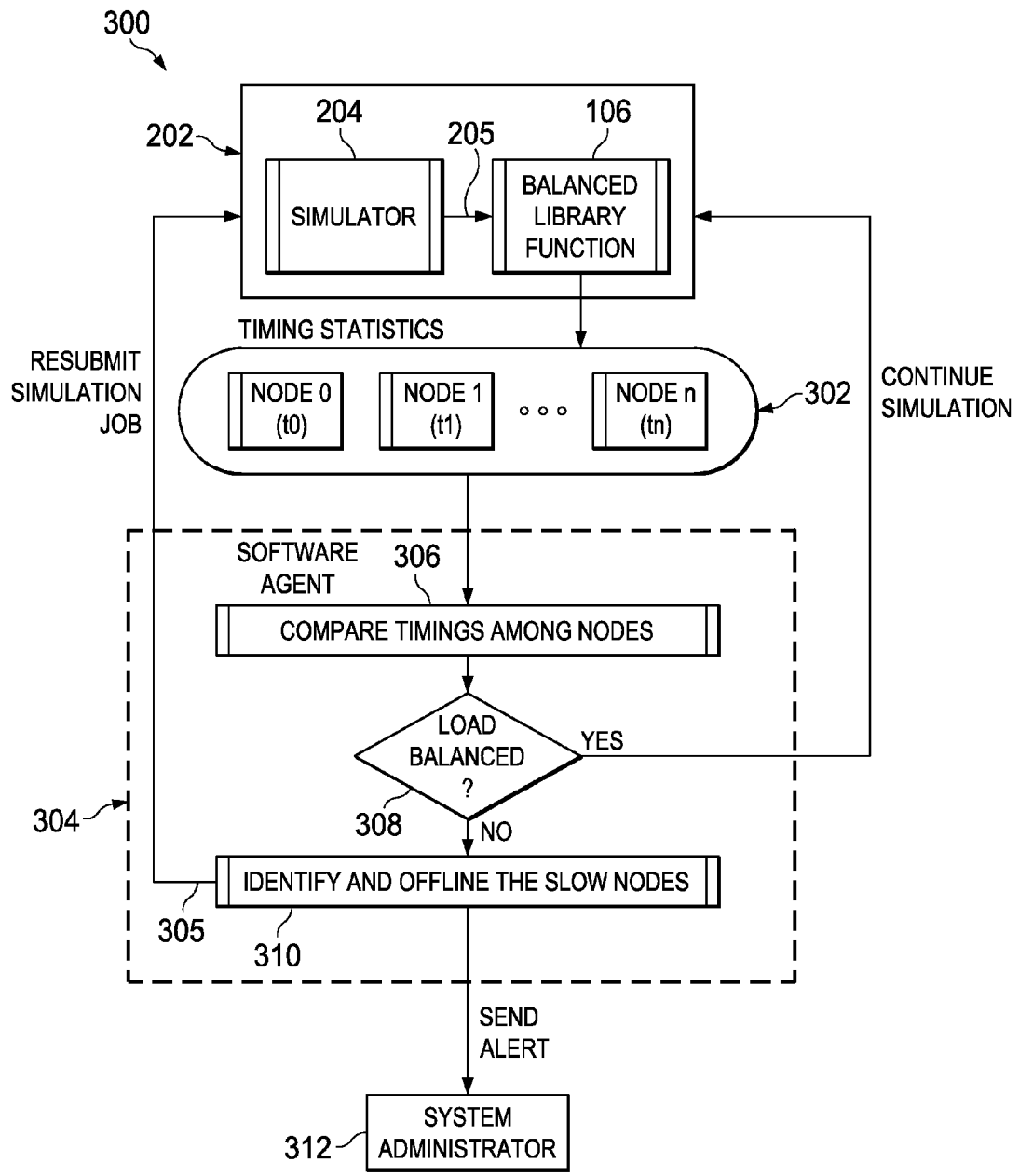
FIG. 3 illustrates a software agent process for circumventing parallel processing load imbalance according to an implementation.

FIG. 3 illustrates a software agent process 300 for circumventing parallel processing load imbalance according to an implementation. Simulator 204 requests 205 execution of the library function 106 on each parallel processing node n. In some implementations, the request 205 from the simulator to execute the library function 106 can be based on a regular interval or on other received/determined data (e.g., some indicate of a hardware issue, failure, less than optimum performance, etc.). Responsive to request 305, the simulator requests 205 execution of the library function 106 which transmits timing statistics 302 for each parallel processing node n to the software agent 304.

The software agent 304 receives the timing statistics 302 for each node n. The software agent 304 then compares received timing statistics among the nodes. For example, in some implementations, the software agent 304 compares 306 the timing on each node n against the average timing calculated for all nodes 102. If the timing on a particular node n is observed to exceed to a predetermined tolerance (e.g., a percentage above the calculated average timing for all nodes 0 . . . n) it can be identified as a faulty node. In other implementations, values other than timing can be used to indicate a faulty node 102. For example, if a CPU associated with a node 102 is returning obviously erroneous results, the node 102 can also be considered faulty.

As illustrated in FIG. 3, if, at 308, the software agent 304 determines from the comparison 306 of the received timing statistics 302 that the load among the nodes 102 is load balanced, the simulation is continued. If, however, at 308, the software agent 304 determines that the load among the nodes 102 is not load balanced, the slow/faulty node 102 is identified by the software agent 304 (e.g., using timing statistics 302 or other calculations based on the timing statistics 302) and a signal is sent to the simulator 204 to offline (remove) the faulty node 102 from the list of nodes 102 available to perform processing of the simulation 202.

In some implementations, the software agent 304 can send an alert message to a system administrator 312 about the corrective action taken due to the faulty node 102 and to permit further investigation of the removed node 102. The alert message can provide, among other things, information about the faulty node 102 and timing statistics from the library function 106.

Figure 4:
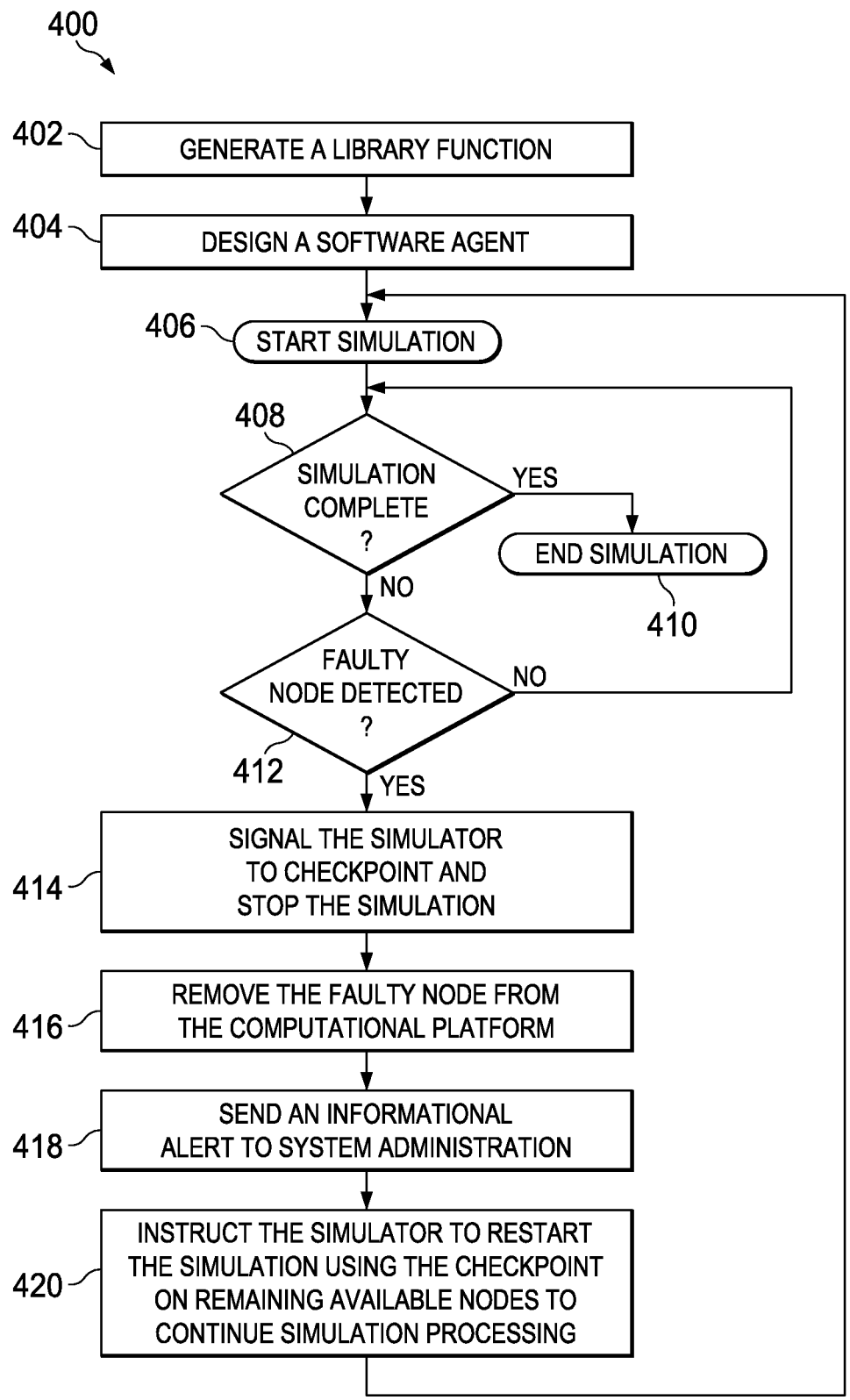
FIG. 4 illustrates a lower-level process for circumventing parallel processing load imbalance according to an implementation.

FIG. 4 illustrates a lower-level process 400 for circumventing parallel processing load imbalance according to an implementation. For clarity of presentation, the description that follows generally describes method 400 in the context of FIGS. 1-3 and 5. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, or in any order.

At 402, a load balanced (or almost load balanced) library function is generated as described with respect to FIG. 1 for nodes used in processing a simulation. From 402, method 400 proceeds to 404.

At 404, a software agent is designed to receive timing statistics from each of the nodes at 402 used in processing the simulation. In some implementations, the software agent compares timing on each node against the average timing of all the nodes as determined by the received timing statistics. If the timing on the particular processor is observed to exceed to a predetermined tolerance, it is identified as a faulty node. From 404, method 400 proceeds to 406.

At 406, the simulation is started. In some implementations, the simulation can be started by the software agent. In other implementations, the simulation can be started by a different process. From 406, method 400 proceeds to 408.

At 408, a determination is made as to whether the simulation is complete. If the simulation is complete, method 400 proceeds to 410 where the simulation ends. In some implementations, the software agent ends the simulation. In other implementations, the simulation can be ended by a different process. If the simulation is not complete, method 400 proceeds to 412.

At 412, a determination is made as to whether a faulty node has been detected. If a faulty node has not been detected, the simulation continues and method 400 proceeds to 408. If a faulty node is detected, method 400 proceeds to 414.

At 414, the software agent signals the simulator to checkpoint the simulation (e.g., create checkpoint data) and to stop the simulation (as described in FIG. 2). In some implementations, the checkpoint data is stored in the above-described storage locations and/or other storage locations accessible and/or shared by all nodes 102. In some implementations, the software agent prepares job submission instructions (e.g., scripts), which can provide locations of all necessary restart files (e.g., checkpoint information) in the storage location. From 414, method 400 proceeds to 416.

At 416, the software agent identifies the faulty node and removes it from a list of available nodes for processing the simulation. In some implementations, the software agent can recover the faulty node's simulation checkpoint status and determine whether the data should be used by any other node and/or whether any additional processing is necessary due to the removal of the faulty node from the computation processor pool. From 416, method 400 proceeds to 418.

At 418, an informational alert message can be sent to a system administrator regarding the corrective action taken due to the faulty node and to permit further investigation of the removed node. In some implementations, the alert message can also provide, among other things, information about the faulty node and timing statistics from the library function. In some implementations, the informational alert message can be sent by text message, email, automated phone call, and other alert message types. From 418, method 400 proceeds to 420.

At 420, the software agent resubmits (restarts) the simulation from the checkpoint taken at 414 on the remaining available nodes. In some implementations, the software agent restarts a parallel job on an available healthy node pool by issuing a job submission instruction to the system (or a job scheduler, etc.) to initiate a new job utilizing the checkpoint (e.g., simulator restart output) data stored on the storage location by the simulator as a result of a signal previously issued by the software agent. From 420, method 400 proceeds to 406.

Figure 5:
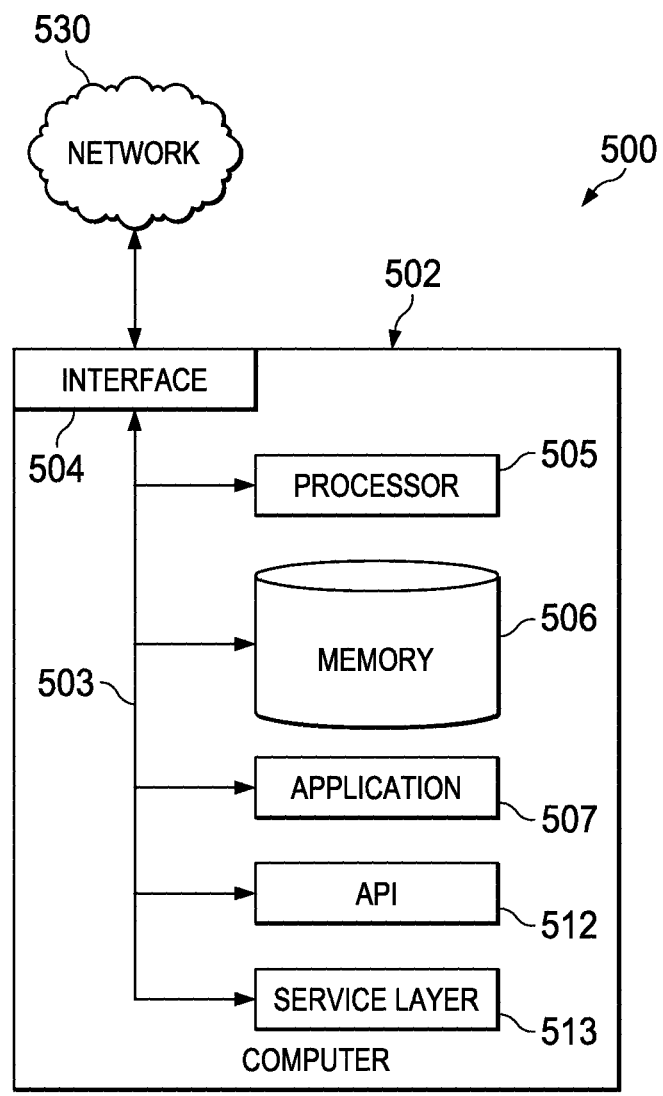
FIG. 5 is a block diagram illustrating an exemplary computer (node) used for circumventing parallel processing load imbalance according to an implementation.

FIG. 5 is a block diagram illustrating an exemplary computer (node) 500 used for circumventing parallel processing load imbalance according to an implementation. While the illustrated computer 502 is intended to encompass a computing device such as a server, the computer 502 can also encompass a desktop computer, laptop/notebook computer, wireless data port, smart phone, personal data assistant (PDA), tablet computing device, one or more processors within these devices, or any other suitable processing device, including both physical and/or virtual instances of the computing device. The computer 502 may comprise a computer that includes an input device, such as a keypad, keyboard, touch screen, or other device (not illustrated) that can accept user information, and an output device (not illustrated) that conveys information associated with the operation of the computer 502, including digital data, visual and/or audio information, or a user interface.

The computer 502 can serve as a client and/or a server. In typical implementations, the computer 502 act as either a parallel processing node 102, host for a software agent 304, and/or a host for an executing simulation 202, simulator 204, library function 106, system administration 312, and/or other application consistent with this disclosure (even if not illustrated). The illustrated computer 502 is communicably coupled with a network 530. In some implementations, one or more components of the computer 502 may be configured to operate within a parallel-processing and/or cloud-computing-based environment. Implementations of the computer 502 can also communicate using MPI or other interface over network 530.

At a high level, the computer 502 is an electronic computing device operable to receive, transmit, process, store, or manage data and information associated with circumventing parallel processing load imbalance. According to some implementations, the computer 502 may also include or be communicably coupled with a simulation server, application server, e-mail server, web server, caching server, streaming data server, business intelligence (BI) server, and/or other server.

The computer 502 can receive requests over network 530 from an application 507 (e.g., executing on another computer 502) and responding to the received requests by processing the said requests in an appropriate software application 507. In addition, requests may also be sent to the computer 502 from internal users (e.g., from a command console or by other appropriate access method), external or third-parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an application programming interface (API) 512 and/or a service layer 513. The API 512 may include specifications for routines, data structures, and object classes. The API 512 may be either computer-language independent or dependent and refer to a complete interface, a single function, or even a set of APIs. The service layer 513 provides software services to the computer 502 and/or system of which the computer 502 is a part. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 and/or the service layer 513 as stand-alone components in relation to other components of the computer 502. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment—including a parallel processing environment—connected to the network 530 (whether illustrated or not). Generally, the interface 504 comprises logic encoded in software and/or hardware in a suitable combination and operable to communicate with the network 530. More specifically, the interface 504 may comprise software supporting one or more communication protocols associated with communications over network 530.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502. Specifically, the processor 505 executes the functionality required to circumvent parallel processing load imbalance.

The computer 502 also includes a memory 506 that holds data for the computer 502 and/or other components of a system of which the computer is a part. Although illustrated as a single memory 506 in FIG. 5, two or more memories may be used according to particular needs, desires, or particular implementations of the computer 502. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502 and/or a system of which the computer 502 is a part, particularly with respect to functionality required to circumvent parallel processing load imbalance. For example, application 507 can serve as (or a portion of) a simulation 202, simulator 204, parallel processing node 102, library function 106, software agent 304, system administrator 312, and/or other application consistent with this disclosure (whether illustrated or not). Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with a computer system performing functions consistent with this disclosure. Further, the term "client," "user," and other appropriate terminology may be used interchangeably as appropriate without departing from the scope of this disclosure. Moreover, this disclosure contemplates that many users/processes may use one computer 502, or that one user/process may use multiple computers 502.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a co-processor (e.g., a graphics/visual processing unit (GPU/VPU)), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
generating a library function for execution on each parallel-processing node of a plurality of parallel-processing nodes executing a simulation controlled by a simulator, the library function a computational and communication load balanced for the plurality of parallel-processing nodes and instrumented to collect timing statistics from each particular parallel-processing node and to transmit the collected timing statistics to a software agent;
receiving timing statistics from each of the plurality of parallel-processing nodes;
determining, using the received timing statistics collectively, that a faulty parallel-processing node exists, wherein the determination compares the received timing statistics for each particular parallel-processing node against an average timing value calculated for the plurality of parallel-processing nodes against a predetermined threshold;
signaling the simulator to checkpoint and stop the simulation executing on the parallel processing nodes; and
removing the faulty parallel-processing node from parallel processing nodes available to execute the simulation.

2. The method of claim 1, wherein the simulator is signaled by the software agent.

3. The method of claim 1, wherein each parallel-processing node suspends operations to execute the library function.

4. The method of claim 1, wherein the determination that a faulty parallel-processing node exists is based, at least in part, on the received timing statistics.

5. The method of claim 1, further comprising generating a checkpoint file containing the status of all non-faulty parallel-processing nodes.

6. The method of claim 5, further comprising instructing the simulator to restart the simulation using the checkpoint file.

7. The method of claim 1, further comprising sending an informational alert to a system administrator, the informational alert containing at least an identification of a faulty node.

8. A non-transitory, computer-readable medium storing computer-readable instructions executable by a computer and operable to:
generate a library function for execution on each parallel-processing node of a plurality of parallel-processing nodes executing a simulation controlled by a simulator, the library function a computational and communication load balanced for the plurality of parallel-processing nodes and instrumented to collect timing statistics from each particular parallel-processing node and to transmit the collected timing statistics to a software agent;
receive timing statistics from each of the plurality of parallel-processing nodes;
determine, using the received timing statistics collectively, that a faulty parallel-processing node exists, wherein the determination compares the received timing statistics for each particular parallel-processing node against an average timing value calculated for the plurality of parallel-processing nodes against a predetermined threshold;
signal the simulator to checkpoint and stop the simulation executing on the parallel processing nodes; and
remove the faulty parallel-processing node from parallel processing nodes available to execute the simulation.

9. The computer-readable medium of claim 8, wherein the simulator is signaled by the software agent.

10. The computer-readable medium of claim 8, wherein each parallel-processing node suspends operations to execute the library function.

11. The computer-readable medium of claim 8, wherein the determination that a faulty parallel-processing node exists is based, at least in part, on the received timing statistics.

12. The computer-readable medium of claim 8, further operable to generate a checkpoint file containing the status of all non-faulty parallel-processing nodes.

13. The computer-readable medium of claim 12, further operable to instruct the simulator to restart the simulation using the checkpoint file.

14. The computer-readable medium of claim 8, further operable to send an informational alert to a system administrator, the informational alert containing at least an identification of a faulty node.

15. A computer system, comprising:
at least one computer interoperably coupled with a memory storage and configured to:
generate a library function for execution on each parallel-processing node of a plurality of parallel-processing nodes executing a simulation controlled by a simulator, the library function a computational and communication load balanced for the plurality of parallel-processing nodes and instrumented to collect timing statistics from each particular parallel-processing node and to transmit the collected timing statistics to a software agent;
receive timing statistics from each of the plurality of parallel-processing nodes;
determine, using the received timing statistics collectively, that a faulty parallel-processing node exists, wherein the determination compares the received timing statistics for each particular parallel-processing node against an average timing value calculated for the plurality of parallel-processing nodes against a predetermined threshold;
signal the simulator to checkpoint and stop the simulation executing on the parallel processing nodes; and
remove the faulty parallel-processing node from parallel processing nodes available to execute the simulation.

16. The computer system of claim 15, wherein the simulator is signaled by the software agent.

17. The computer system of claim 15, wherein each parallel-processing node suspends operations to execute the library function.

18. The computer system of claim 15, wherein the determination that a faulty parallel-processing node exists is based, at least in part, on the received timing statistics.

19. The computer system of claim 15, further configured to:
generate a checkpoint file containing the status of all non-faulty parallel-processing nodes; and
instruct the simulator to restart the simulation using the checkpoint file.

20. The computer system of claim 15, further configured to send an informational alert to a system administrator, the informational alert containing at least an identification of a faulty node.

\* \* \* \* \*